United States Patent [19]
Okayama et al.

[11] Patent Number: 5,291,606
[45] Date of Patent: Mar. 1, 1994

[54] INTERRUPT CONTROL UNIT

[75] Inventors: Sachiko Okayama; Tsuyoshi Katayose, both of Tokyo, Japan

[73] Assignee: NEC Corporation, Tokyo, Japan

[21] Appl. No.: 860,669

[22] Filed: Mar. 30, 1992

[30] Foreign Application Priority Data

Mar. 29, 1991 [JP] Japan ................................. 3-066153

[51] Int. Cl.$^5$ ............................................. G06F 9/46
[52] U.S. Cl. ............................ 395/725; 364/DIG. 1;
364/241.2; 364/241.5; 364/242.1
[58] Field of Search ........................................ 325/725

[56] References Cited

U.S. PATENT DOCUMENTS

| | | | |
|---|---|---|---|
| 4,734,882 | 3/1988 | Romagosa | 395/725 |
| 4,807,117 | 2/1989 | Hoku et al. | 395/725 |
| 4,847,752 | 7/1989 | Akashi | 395/725 |
| 4,907,149 | 3/1990 | Gula et al. | 395/725 |

*Primary Examiner*—Debra A. Chun
*Attorney, Agent, or Firm*—Whitham & Marhoefer

[57] ABSTRACT

In an interrupt controller, interrupt processing mode indication circuits are provided for each interrupt request circuit for storing interrupt processing mode information, and priority level indication circuits are provided for each interrupt request circuit, for storing acknowledgement order information. A search information generating circuit is provided each for generating interrupt processing mode search information and priority order search information. A search information comparison circuit detects the state of the interrupt request circuit provided for each interrupt request memory circuit, and compares the processing mode information and the acknowledgement order information with the interrupt processing mode search information and priority order search information. When the processing mode of the search information generating circuit coincides with one of the processing mode indication circuits, an internal interrupt receipt signal is generated by the search information comparison circuit in response to the interrupt request signals generated by the search information comparison circuits. When the processing mode of the search information generating circuit does not coincide with any one of the processing mode indication circuits, the processing mode search information is updated and an internal interrupt receipt signal is generated in response to the interrupt request signal generated by the search information comparison circuit when the priority order search information of the search information generating circuit perfectly coincides with the acknowledgement order information of one of the priority order indication circuits.

5 Claims, 7 Drawing Sheets

INTERRUPT CONTROL UNIT

Background of the Invention

1. Field of the Invention

The present invention relates to an interrupt control unit, and more particularly to a unit for controlling the priority discrimination of the interrupt processing including a plurality of modes of interrupt processing.

2. Description of Related Art

Hitherto, an interrupt control unit for controlling a request of an urgent processing (called "interrupt processing" hereinafter) to a CPU (central processing unit) has become indispensable to a microcomputer system.

If a request signal for an interrupt processing is applied from a peripheral unit to an interrupt control unit, the interrupt control unit informs a CPU of the request of an interrupt processing by discriminating the priority order of an interrupt source and the interrupt processing and activating an interrupt request signal (called "INTRQ signal" hereinafter) with respect to the CPU. The CPU, which has detected the active state of the INTRQ signal, can start the interrupt processing after the execution of an instruction being currently executed has been completed.

The microcomputer system comprises a plurality of interrupt modes in order to respond to the degree of urgency of every interrupt request with flexibility.

Among these interrupt modes, there are a vector interrupt and a macroservice.

The vector interrupt is an interrupt mode as follows: When the interrupt request is applied, the status information of the program in the course of execution by the CPU is saved to a memory area designated by a stack pointer, and a vector, which is data for selecting a program corresponding to an interrupt request source from among a plurality of interrupt processing programs, is sent to the CPU from a peripheral unit or an interrupt request control unit, so that a head address of a corresponding interrupt processing program is obtained on the basis of the vector. After the execution of the interrupt processing, the status information saved in the memory is transmitted to the CPU and it returns to the program which was in the course of execution before the interrupt processing.

In the macroservice, when an interrupt request is generated, the processing designated by a register of an internal RAM is started while maintaining the status condition of the program, and an interrupt processing is executed in accordance with a microprogram in the microcomputer. After completion of the execution of the interrupt processing, an instruction is read from a program memory, and the execution of the user program or another interrupt processing is restarted.

For example, a typical microcomputer having a prior art interrupt control unit comprises a CPU for controlling the whole of the system, two interrupt control registers separately provided each corresponding to each interrupt source, an interrupt controller which sends an INTRQ (interrupt request) signal and a MS/INT (macroservice/vector interrupt selection) signal to the CPU and receives an IFCLR (interrupt flag clear) signal from the CPU, a scanning counter for discriminating the priority of the interrupt processings, and a daisy chain for selecting an interrupt source from interrupt sources which have been discriminated as being at the same level of priority by the scanning counter according to the priority order inherent in the system.

The scanning counter can be composed of a binary counter which successively counts up "00B", "01B", "10B" and "11B" in the named order and then repeats the counting from "00B" when it reaches "11B". Here, the suffix "B" indicates that the number added with "B" at its end is represented in a binary notation. A period in which the scanning counter counts from "00B" to "11B" is called a "scanning cycle". The scanning counter activates a zero signal at a timing when the count value becomes "00B". The zero signal is sent to the interrupt control registers and starts the action for discriminating the priority of the interrupt requests inputted during the previous scanning cycle. Further, the interrupt control registers output an internal interrupt request signals (called "IRQ signal" hereinafter) to the daisy chain, respectively, and the scanning counter stops its counting while maintaining the content when either of the interrupt control registers outputs an active IRQ signal.

For example, the priority which can be set by the interrupt control registers includes four levels from level 0 to level 3, and the contents of the scanning counter correspond to the four interrupt priority level. The level 0 is the highest priority level, and the level 1 is a second priority level. The level 2 is a third priority level, and the level 3 is the lowest priority level.

The above mentioned interrupt control unit of the prior art executes the interrupt priority discrimination by utilizing the scanning counter, and starts the priority discrimination of the interrupt requests generated from a timing in which the count value of the scanning counter is "00B" up to that time. For example, assume that an interrupt request of the interrupt source having the priority level "1" has its interrupt processing mode set at the macroservice, and a vector interrupt has the same priority level but is a higher priority level in the daisy chains. If these two interrupt requests are concurrently generated, the vector interrupt is acknowledged prior to the macroservice.

Even if the macroservice is acknowledged after the vector service had been acknowledged, there has been no problem in the case of performing a simple data transfer by means of the macroservice.

However, it has been required that the interrupt processing should be executed as soon as possible after the generation of the interrupt in the case of receiving communication data. Although the macroservice having no substantial overhead for the interrupt processing is used, if the interrupt processing modes and the priority level discrimination in accordance with the prior art have been executed, this request cannot be complied.

SUMMARY OF THE INVENTION

Accordingly, it is an object of the present invention to provide an interrupt control unit which has overcome the above mentioned defect of the conventional one.

Another object of the present invention is to provide an interrupt control capable of reducing the time required for the priority discrimination and of fastening the acknowledgment of the vector interrupt.

The above and other objects of the present invention are achieved in accordance with the present invention by an interrupt control unit comprising a plurality of interrupt memory circuits each for storing a request state of the interrupt processing for each interrupt source, interrupt processing mode indication circuits each provided for each interrupt request circuit for storing interrupt processing mode information, priority level indication circuits each provided for each interrupt request circuit, for storing acknowledgement order information, search information generating circuits each for generating interrupt processing mode search information and priority order search information, a search information comparison circuit for detecting the state of the interrupt request circuit provided for each interrupt request memory circuit, and comparing the processing mode information stored in the interrupt processing mode indication circuit and the acknowledgement order information stored in the priority level indication circuit with the search information composed of the interrupt processing mode search information and priority order search information generated in the search information generating circuit, by dividing a comparison extent into a plurality of comparison ranges, the search information comparison circuit generating an internal interrupt request signal when a coincidence is obtained in the comparison range, and a control circuit for updating the interrupt processing mode search information and the priority order search information in the search information generating circuit in accordance with the result of the comparison in the search information comparison circuit, so that an output of the search information comparison circuit is monitored, and when the processing mode of the search information generating circuit coincides with one of the processing mode indication circuits, an internal interrupt receipt signal is generated in response to the interrupt request signals generated by the search information comparison circuits, and when the processing mode of the search information generating circuit does not coincide with any one of the processing mode indication circuits, the processing mode search information is updated and an internal interrupt receipt signal is generated in response to the interrupt request signal generated by the search information comparison circuit when the priority order search information of the search information generating circuit perfectly coincides with the acknowledgement order information of one of the priority order indication circuit.

The above and other objects, features and advantages of the present invention will be apparent from the following description of preferred embodiments of the invention with reference to the accompanying drawings.

DESCRIPTION OF THE PREFERRED EMBODIMENTS

Figure 1:
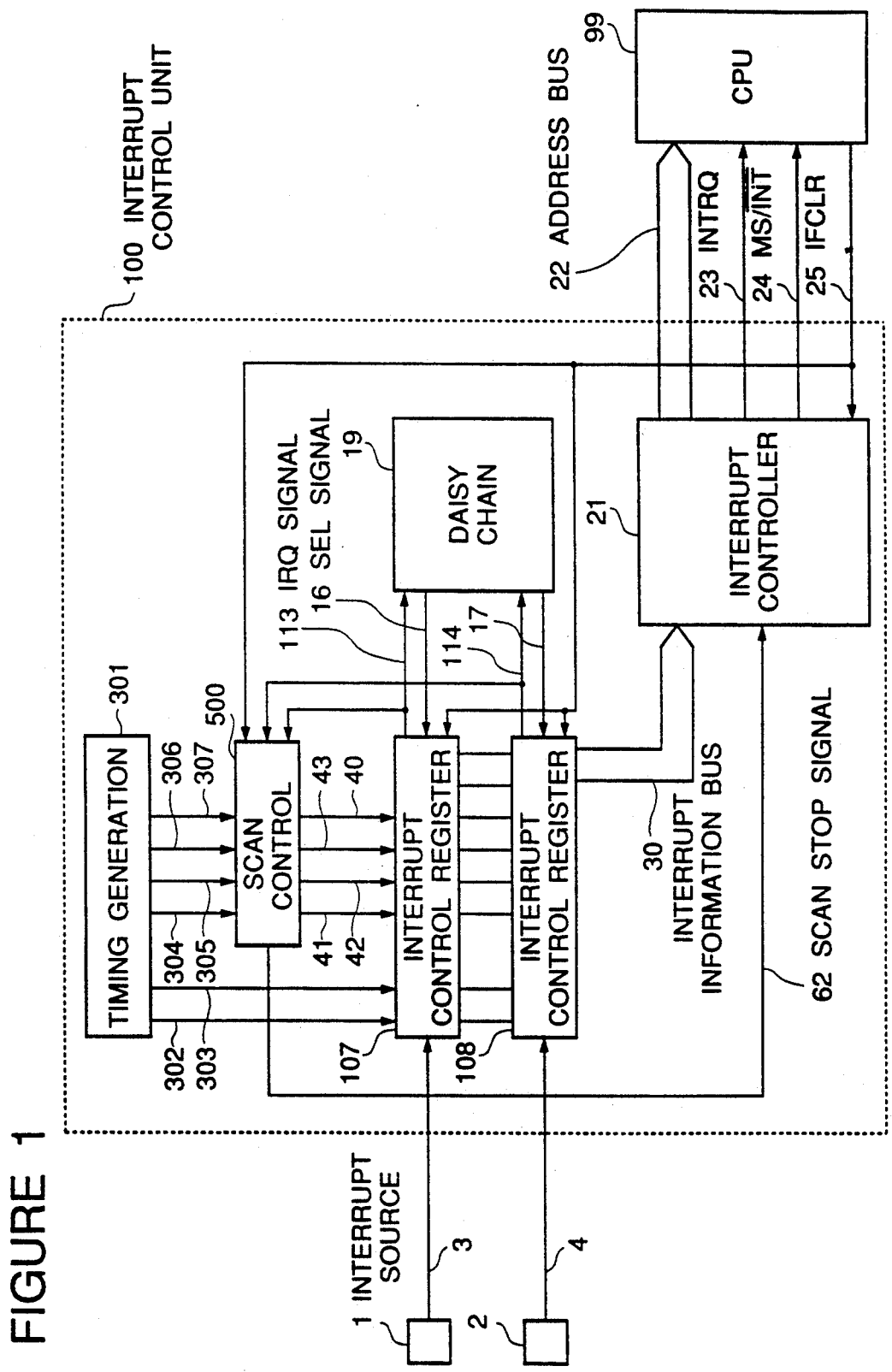
FIG. 1 is a block diagram of a first embodiment of the interrupt control unit in accordance with the present invention.

Referring to FIG. 1, there is shown a block diagram illustrating a structural example of the microcomputer system having an interrupt control unit 100 in accordance with the present invention. This microcomputer comprises a CPU 99 for controlling the whole of the microcomputer system, interrupt control registers 107 and 108 corresponding to interrupt sources 1 and 2, respectively, an interrupt controller 21 which sends an INTRQ (interrupt request) signal 23 and a MS/INT (macroservice/vector interrupt selection) signal 24 to the CPU 99 and receives an IFCLR (interrupt flag clear) signal 25 from the CPU 99, a scanning control circuit 500 for discriminating the processing mode and the priority order of the interrupt processing, a daisy chain 19 for executing a priority discrimination inherent to the system for the interrupt sources which have been discriminated to be at the same level of the priority order, and a timing generating circuit 301 for generating a timing signal in order to updating the information for discriminating the processing mode and the priority order to the interrupt processing.

Figure 2:
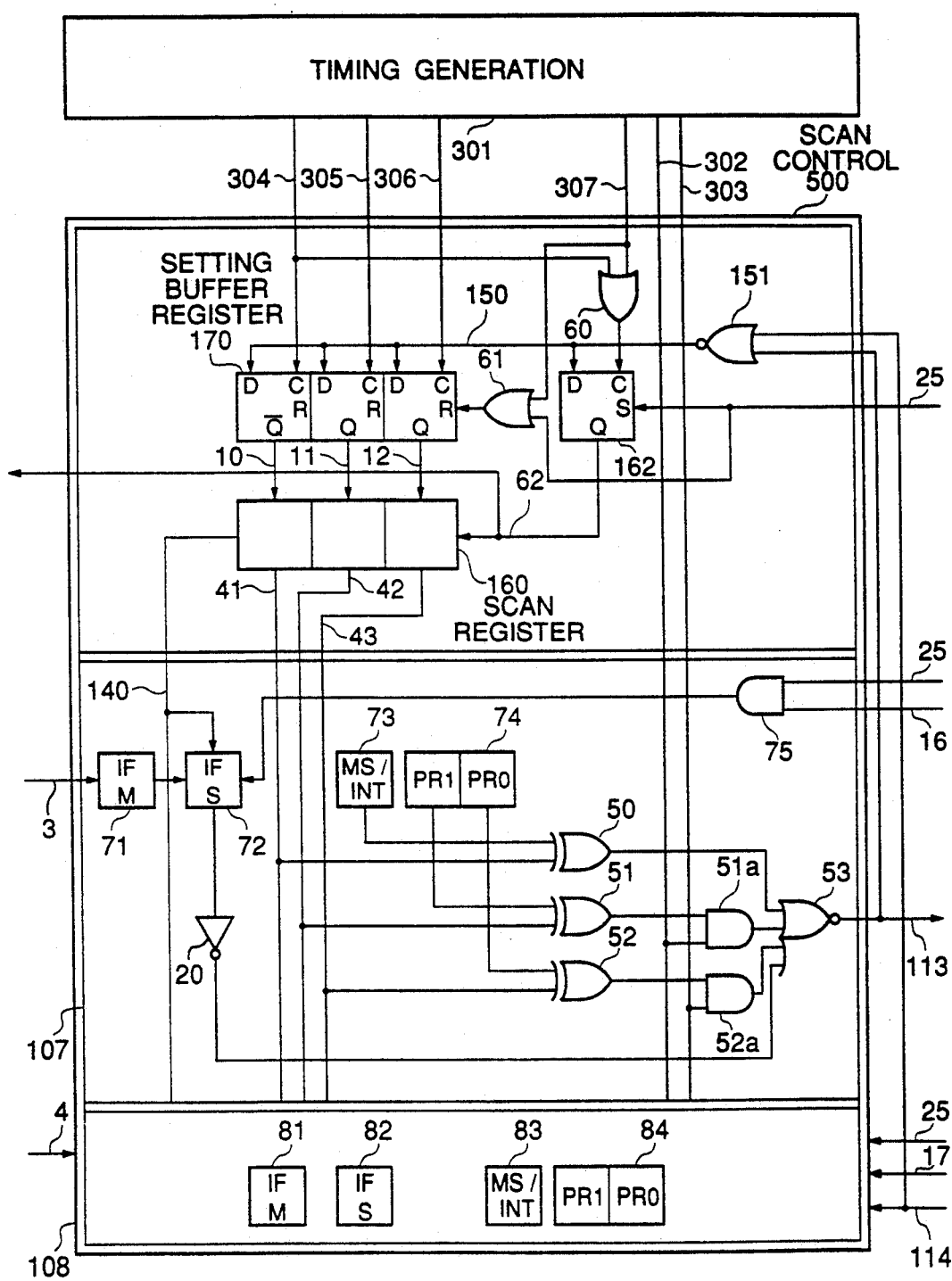
FIG. 2 is a logic diagram showing the construction of the interrupt control registers, the timing generating circuit and the scan control circuit of the first embodiment.

FIG. 2 is a block diagram illustrating the composition of the interrupt control register 107, 108, the scanning control circuit 500 and the timing generating circuit 301. First of all, the interrupt control registers will be described. The interrupt control registers 107 and 108 have the same composition, and therefore, only the interrupt control register 107 will be described in detail.

Figure 2A:
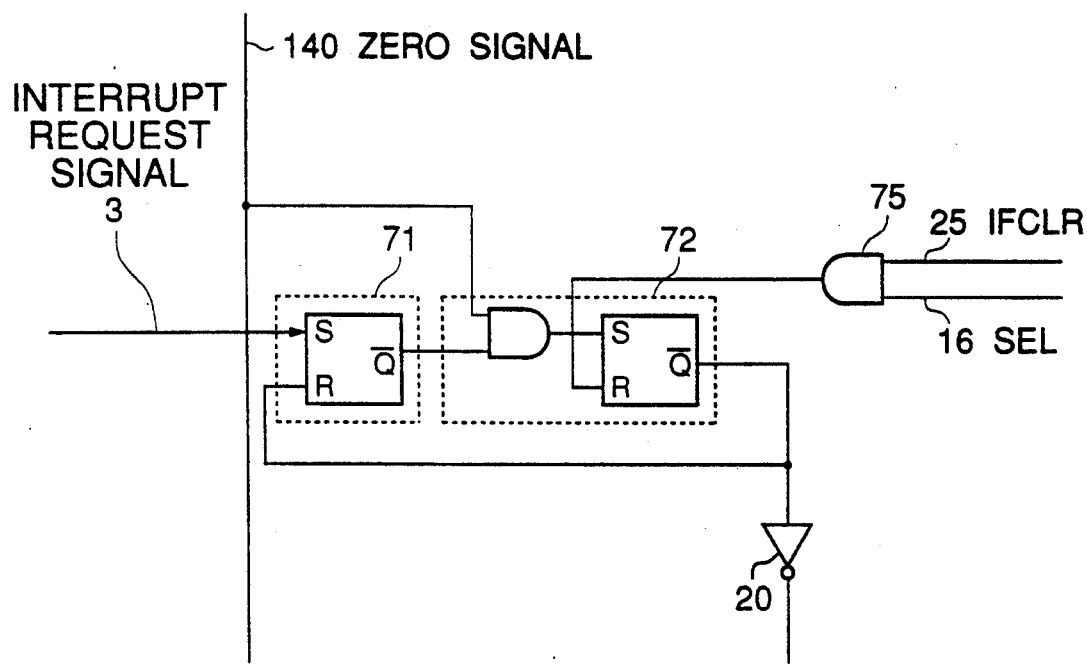
FIG. 2A is a logic diagram of the interrupt master flag and the interrupt slave flag shown in FIG. 2.

The interrupt control register 107, like a conventional interrupt control register, comprises an IF (interrupt flag) master 71, an IF slave 72, a MS/INT flag 73, a priority indication bit 74 (called "PRI" hereinafter), XOR gates 50, 51 and 52 and a NOR gate 53. In addition, the register comprises AND gates 51a, 52a and 75. The IF master 71 and the IF slave 72 can be formed of two RS flipflops and an AND gate as shown in FIG. 2A.

The interrupt control register receives an interrupt request signal 3 from the interrupt source 1. When the IF master 71 receives the interrupt request signal 3 it generates an interrupt request of "1". The IF slave 72 latches the output value of the IF master 71 when a zero signal 140 is "1". An output of the IF slave 72 is applied to the NOR gate 53 through an inverter 20. Further, an output of the MS/INT flag 73 is applied to the XOR gate 50.

An output PR1 of the PRI 74 and an output signal 42 of the scanning register 160 are applied to the XOR gate 51. An output of the XOR gate 51 and a timing signal 302 are applied to the AND gate 51a. Similarly, an output PR0 of the PRI 74 and an output signal 43 of the scanning register 160 are applied to the XOR gate 52. An output of the XOR gate 52 and a timing signal 303 are applied to the AND gate 52a. Outputs of the XOR gate 51 and the AND gates 51a and 52a are applied to an NOR gate 53 together.

Thus, the output signals 41, 42, 43 of the scanning register 160 correspond to the respective bit outputs of the PRI.

The scanning control circuit 500 comprises a setting buffer register 170, a scan stop flag 162, a scanning register 160, a NOR gate 151 and OR gates 60 and 61. The setting buffer register 170 is composed of three latch circuits equipped with resets and these latch circuits latch the output level of the NOR gate 151 when the timing signals 304, 305 and 306 are "1", respectively. When the timing signal 307 is "1", the most significant bit and other bits of the setting buffer register are also reset at "1" and "0", respectively. The IRQ signals 113 and 114 are applied to the NOR gate 151 and an output signal 150 (called "IRQ detection signal" hereinafter) is applied to three inputs of the control buffer register 170 and a scan stop flag 162. Further, an output signal 62 of the scan stop flag 162 is applied to the scanning register 160 and this scanning register 160 latches the output of the setting buffer register 170 when the output of the scan stop flag 162 is "1". This scan stop flag latches the IRQ detection signal 150 of the timing signal 304 or 307 and the zero signal 140 is rendered active at a timing when the content of the scan register becomes "100B".

Figure 3:
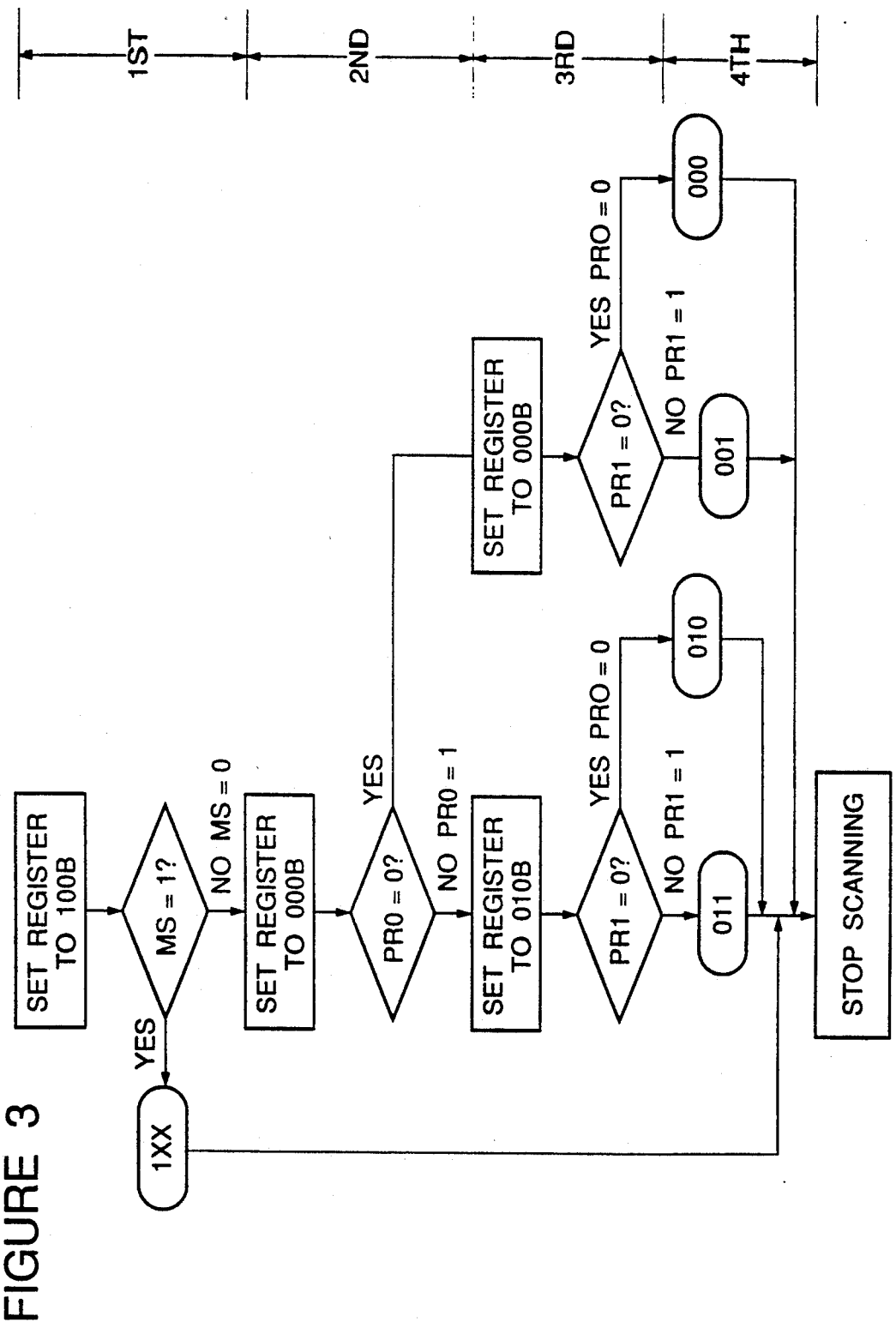
FIG. 3 shows the scanning order of the interrupt priority.

The interrupt control register 108 corresponds to the interrupt control register 107. Like the example of the prior art, an IF master 81, an IF slave 82, a MS/INT flag 83 and a PRI 84 correspond to the IF master 71, the IF slave 72, the MS/INT 73 and the PRI 74, respectively. An IRQ signal 114 also corresponds to the IRQ signal 114. Like the interrupt request signal 3, an interrupt request signal 4 is applied to the control register 108. FIG. 3 represents the processing mode and the priority order of this embodiment.

First of all, the most significant bit of the scan register 160 is compared with those of the MS/INT flags 73 and 83 in the first step. If there is a coincidence between the scanning register and either of the MS/INTs, the scanning stops since it is considered that there is an interrupt request for executing the macroservice at this time.

When there is no coincidence between the scanning register 160 and the MS/INT flags, the most significant bit of the scanning register 160 is modified and compared with the most significant bit of the PRIs 74 and 84 in the second step. In the third step, the second bit of the scan register is modified according to the preceding coincidence discrimination and compared with the second and third bits of the PRIs 74 and 84. In the fourth step, the final highest priority ordered bit is discriminated.

Figure 4:
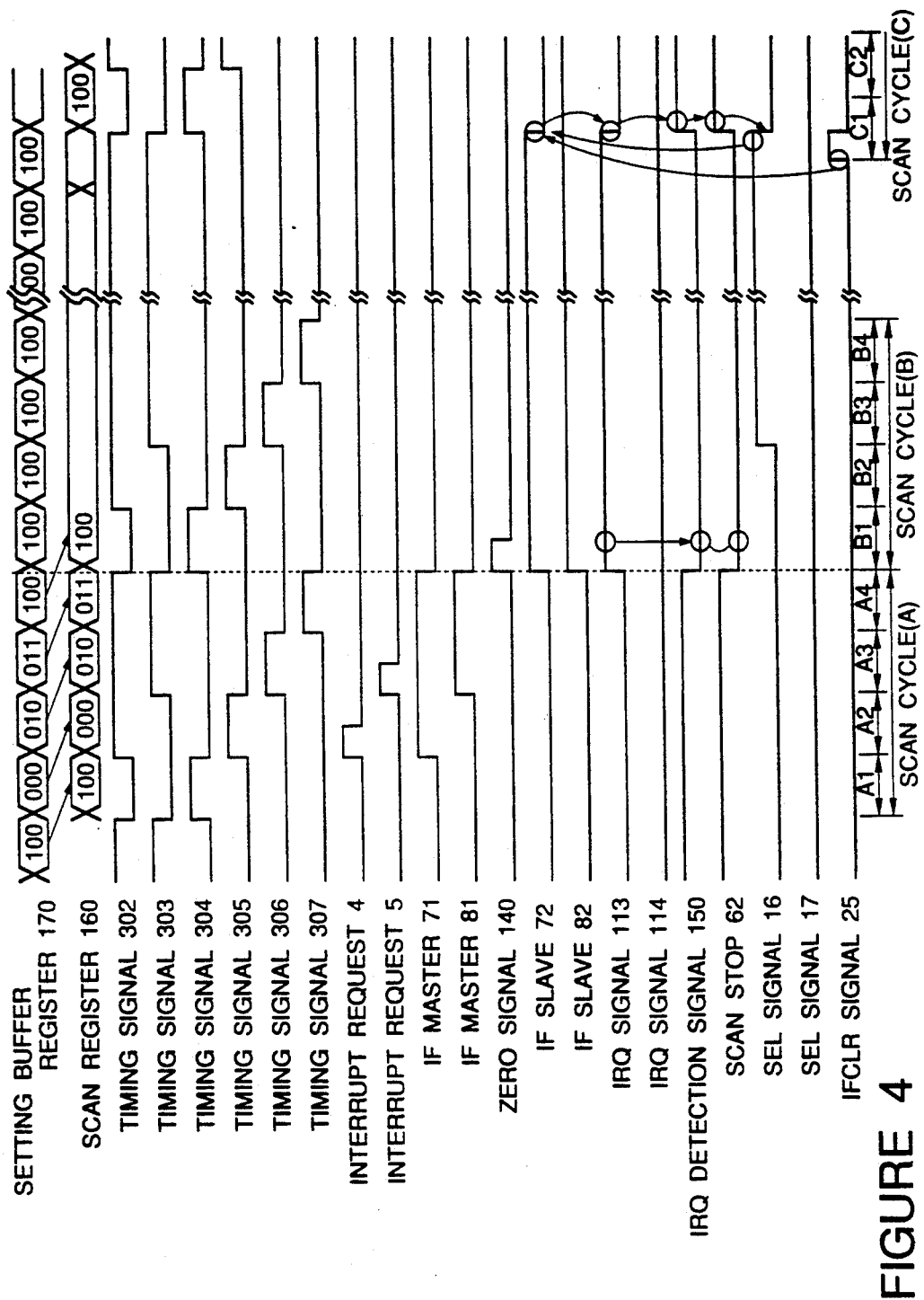
FIG. 4 is a timing chart of the processing mode discrimination in the first embodiment.

Referring to FIG. 4, the operation from the input of the interrupt request signal to the discrimination of the processing mode and the receipt of an interrupt request will be described. Here it is assumed that the interrupt sources 1 and 2 are set with the priority order "2" and the macroservice processing mode (MS/INT="1") and the priority order "2" and the vector interrupt processing mode (MS/INT="0"). In FIG. 4, the interrupt request signals 3 and 4 are asynchronously generated after the output value of the scanning register 160 becomes "100B" during the scanning cycle 4.

Since the IF slave is previously set at "0" and the latches the output of the IF master latches when the output value of the scanning register 160 becomes "100B", only the IF master is set after the output value of the scanning register 160 is "100B" even if the interrupt request signal is rendered active.

The setting buffer register 170 is reset when the timing signal 307 is at a high level, and the output becomes "100B". Then, the operation for the priority discrimination starts when the timing signal 304 becomes "1".

During the scanning cycle A, the IRQ detection signal 150 is always "1" since the IF slave is not set.

During a period A1 of the scanning cycle A, the timing circuit 304 becomes "1" and the output signal 10 of the most significant bit of the setting buffer register 170 is modified to "0". Thus, the value of the setting buffer register 170 becomes "000B" and the following detection is executed at "000B". Then, since the timing circuit 305 becomes "1", the output signal 11 of the second bit of the setting buffer register 170 becomes "1" and so the output of this setting buffer register 170 becomes "010B". During the next period A3, the output of the scanning register 160 becomes "010B".

Since the timing signal 306 becomes "1" during the period A3, the output signal 12 of the least significant bit of the setting buffer register 170 becomes "011B" and the output of the scanning register 160 becomes "011B" during the following period A4.

During the period A4, the timing signal 307 becomes "1", however an output signal 62 of the scan stop flag 162 (called "scan stop signal" hereinafter) is still "1" because the IRQ detection signal 150 at "1" is applied.

Since the scan stop signal 62 is still "1", it is possible to rewrite the scan buffer register 160.

Then the setting buffer register 170 is reset at "100B" when the timing signal 307 becomes "1". Thus, the output of the scanning register 160 is "100B" during the period B1 of the scanning cycle B.

When the output value of the scanning register 160 is "100B", the zero signal 140 is rendered active at "1" and the output levels of the IF masters 71, 81 are transmitted to the IF slave 72, 82, respectively. As a result, they are all set at "1".

Further, during the period B1, the timing circuit 302 is "0" and the AND gate 51a sends "00" to the NOR gate 53. Similarly, the AND gate 52a sends "0" to the NOR gate 53 since the timing signal 303 is also "0". Further, the output of the XOR gate 50 is "0". Thus, the IRQ signal 113 becomes "1".

During the period B1, the scan stop flag 162 latches the level "0" of the IRQ detection signal 150 by the timing signal 304 and the scan stop signal 62 is set to "0". So it is impossible to rewrite the content of the scanning register 160.

Thus, the next period B2 is not executed.

Since the IRQ signal 113 is "1", the daisy chain 19 outputs a SEL signal 16.

The control of the IRQ signal in the daisy chain 19 is executed in a manner identical to that of the prior art and the SEL signal is sent to the interrupt control register with fixed high priority order even if a plurality of signals IRQ exist.

The interrupt information controller 21 receives the scanning stop signal 62 and read register information of the interrupt control register 107 selected by the SEL signal through the interrupt information bus 30. The interrupt controller 21 generates the address information from the read information and outputs it through the address information bus 22. In addition, it activates the INTRQ signal 23 and the MS/INT signal 24 and informs the CPU99 of the interrupt by macroservice.

Next, the CPU 99 executes the interrupt processing and sends the IFCLR signal 25 to the interrupt control unit 100 at the end of the interrupt.

During the period C1, the IFCLR signal is rendered active and the interrupt information controller 21 is reset. Similarly, the scanning control circuit 500 is reset and the IF slave 72 of the interrupt control register 107, selected by the SEL signal 16, is reset. At the end of the reset, the IRQ signal 113, the IRQ detection signal 150 and the scan stop circuit 62 becomes "0", "1" and "1", respectively.

Thus, it is possible that the scanning control circuit 500 outputs during the period C2 at the timing identical to that during the period B2 and executes the interrupt priority holding in the IF slave 82.

As mentioned above, in the interrupt control unit of the present invention, the interrupt request signal is applied and the processing mode discrimination is started at a timing "100B" of the scanning register 160 and finished for one clock so that the receipt of the macroservice is quickly executed. Further, in the case of the vector interrupt, the waiting time for starting the priority discrimination of the interrupt requests applied during the scannings "100B", "000B", "010B", "011B" is 4 clocks at maximum.

Another embodiment of the present invention will be described.

Figure 5:
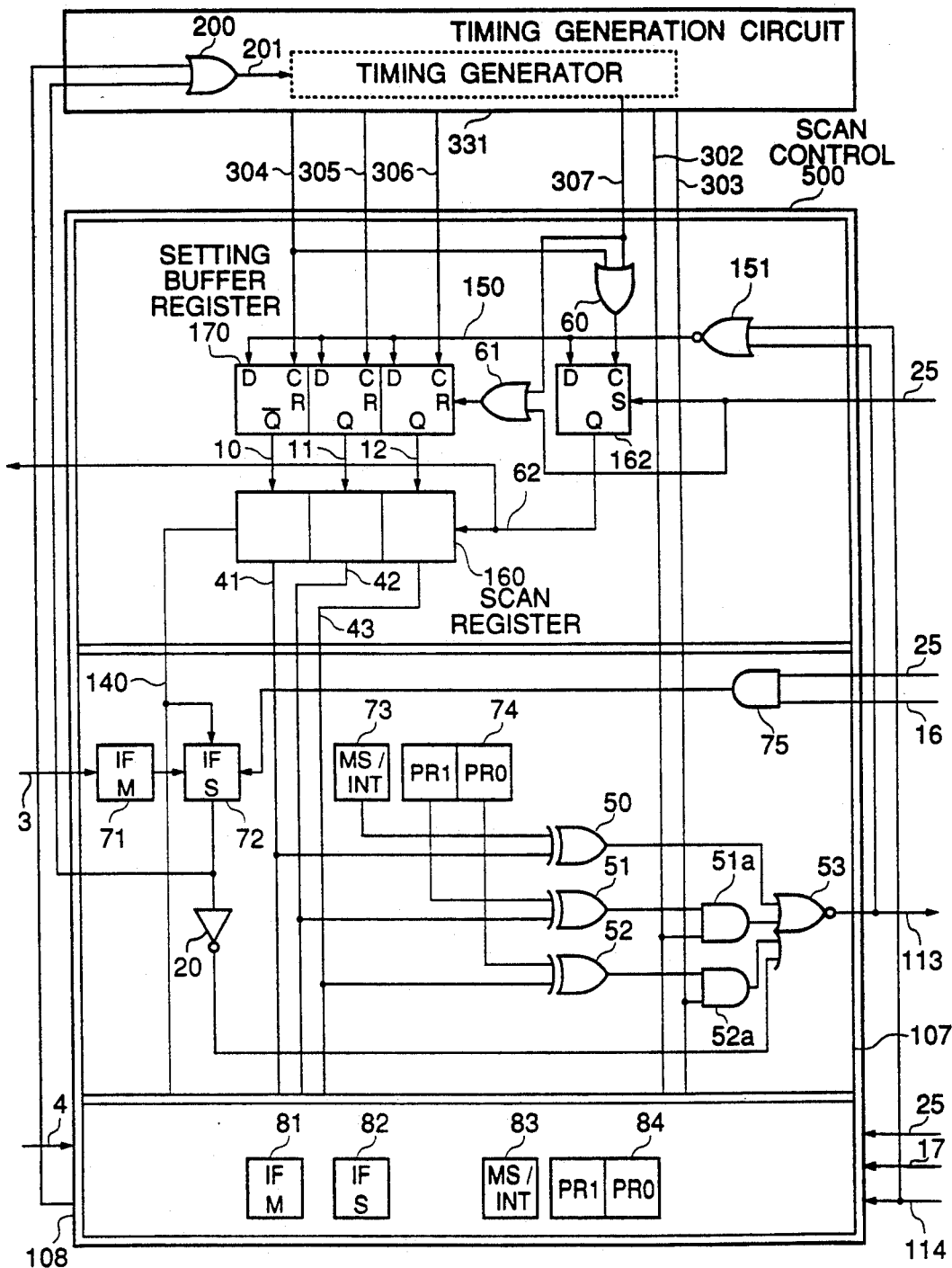
FIG. 5 is a logic diagram showing the construction of the interrupt control registers, the timing generating circuit and the scan control circuit of the second embodiment.

FIG. 5 illustrates the composition of the interrupt control registers 107, 108, the scanning control circuit 500 and the timing generation circuit 331 of this embodiment.

The present embodiment differs from the first embodiment in control of the timing signals 302 to 307 of the timing generation circuit. The composition and function of the interrupt control registers 107, 108 and the scanning control circuit 500 are identical to those of the first embodiment and will not be described in detail.

In this embodiment, the timing generation circuit 331 receives the outputs of the IF slaves 72 and 82. Each output of the IF slaves 72, 82 is applied to the OR gate 200 and an interrupt request signal 201 is generated.

In the timing generation circuit 331, all the timing signals 302 to 307 are "0" and not modified while the interrupt request detection signal 61 is "0".

When either the IF slave 72 or 82 is set at "1" by the zero signal 140, the interrupt request detection signal 201 is "1" and the holding of the timing signals 302 to 307 is released.

Relative to the processing form, the process for searching the priority is the same as that of the first embodiment. Namely, in the case that there is a coincidence between the MS/INT and the most significant bit of the scanning register 160 while the timing circuit 302 is "1", the scanning stop signal 62 becomes "0" and so the IRQ signal is applied to the daisy chain 19 and the interrupt by macroservice is received. In the case that the most significant bit of the scanning register does not coincide with the MS/INT, the search of the interrupt priority by the level of the timing signals 302 to 307 is continued.

Figure 6:
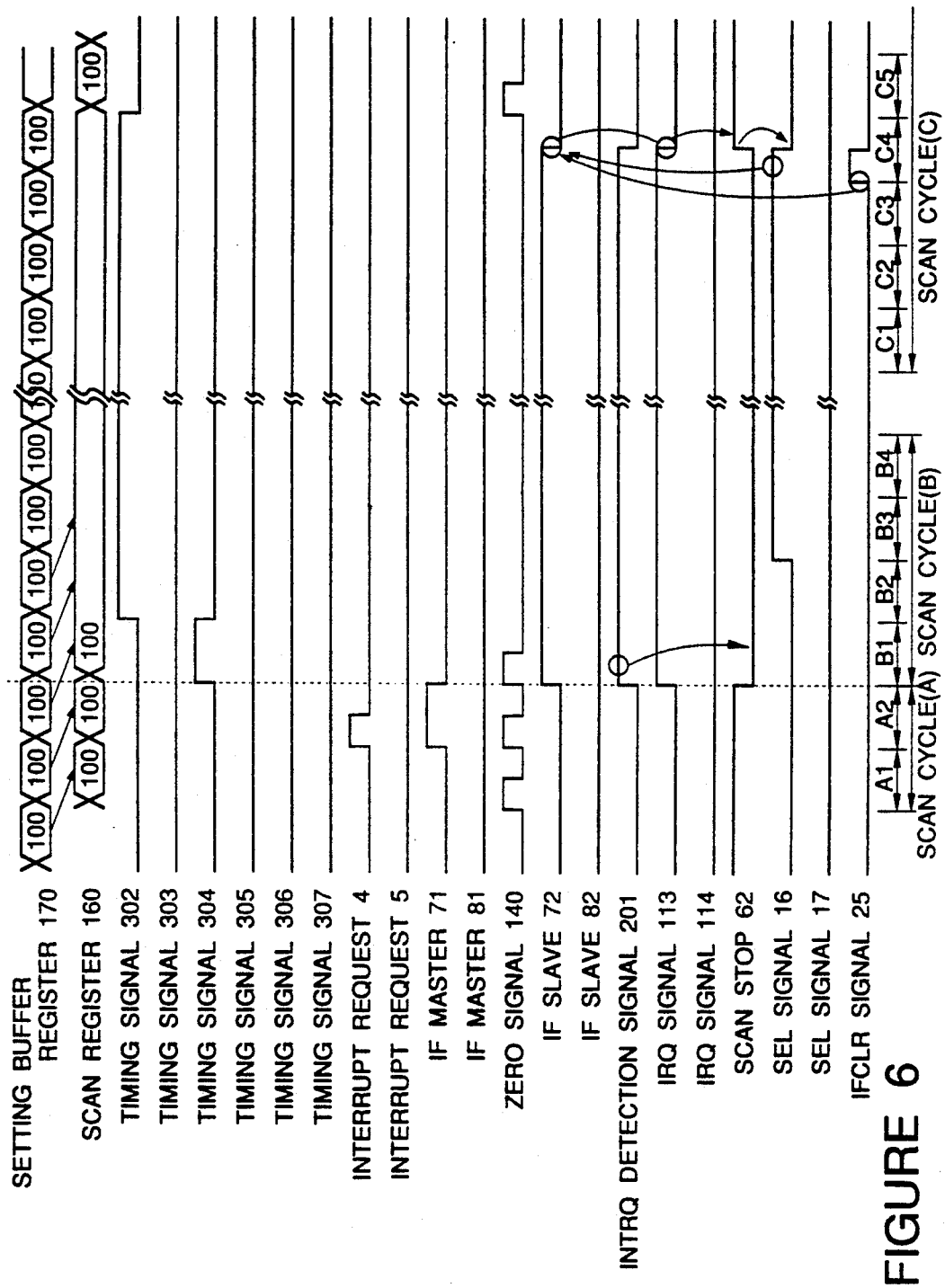
FIG. 6 is a timing chart of the processing modes discrimination in the second embodiment.

The operation from the input of the interrupt request signal till the processing mode and the priority order is discriminated and the interrupt is received will be described with reference to FIG. 6. In this embodiment, it is assumed that the interrupt source is set with the priority order "2" and the processing mode of the macroservice (MS/INT).

Firstly, since no interrupt request is generated during the scanning cycle A, the interrupt request detection signal 201 is "0". The timing signals 302 to 307 are continued to be in the reset state and the setting buffer register 170 is "100". The output of the scanning register 160 is "100". The interrupt request signal 4 is asynchronously generated. The interrupt request signal 4 makes the IF master 71 "1".

The process for discriminating the processing mode during the scanning cycle B is identical to that of the first embodiment.

During the period B1, the output of the scanning register 160 becomes "100B". When the output value of the scanning register 160 is "100B", the zero signal 140 is rendered active "1" and the output signal level of the IF master 7 is transmitted to the IF slave 72. The interrupt detection signal 201 becomes "1" and the timing generation circuit 331 is released from holding the timing signals 302 to 307. During the period B1, the timing signal 302 is "0" and the AND gate 51a sends "0" to the NOR gate 53. The output of the XOR gate 50 also becomes "0". Thus, the IRQ signal 113 becomes "1".

During the period B1, the scan stop flag 162 latches the level "0" of the IRQ detection signal 150 by the timing circuit 304. The scan stop signal 62 is rendered "0" and it is prohibited to rewrite the content of the scan register 160.

Thus, only the processing by macroservice is executed from the next period B2 on.

Since the IRQ signal 113 is "1", the daisy chain 19 outputs the SEL signal 16.

The control of the IRQ signal in the daisy chain 19 is executed in a manner identical to that of the prior art and the SEL signal is sent to the interrupt control register having a fixed high priority order even if there are a plurality of signals IRQ.

The interrupt information controller 21 receives the scan stop signal 62 and reads the register information of the interrupt control register 107 selected by the SEL signal through the interrupt information bus 30. This interrupt information controller 21 generates the address information from the read information and sends it to the CPU 99 through the address information bus 22. In addition, the controller activates the INTRQ signal 23 and the MS/INT signal 24 and informs the CPU 99 of the generation of the interrupt by macroservice.

Successively, the CPU 99 executes the interrupt processing by macroservice and sends the IFCLR signal 25 to the interrupt control unit 100 at the end of the interrupt.

During the period C4, when the IFCLR signal 25 is rendered active, the interrupt information controller 21 is reset. Similarly, the scanning control circuit 500 is reset and the IF slave 72 of the interrupt control register 107, selected by the SEL signal 16, is reset. At the end of these resets, the interrupt request signal 201, the IRQ signal 113 and the IRQ signal 150 become "0", "0" and "1", respectively.

Thus, the scanning control circuit 500 is returned to the initial state at the period C5.

Like the first embodiment, the vector interrupt request is saved in the IF slave in the course of the execution of the macroservice when the interrupts set with macroservice and vector service are generated at the same time although only the interrupt request set with the macroservice was described. Thus, after the macroservice processing, the processing mode and the priority order are again discriminated so that the vector interrupt is received.

As mentioned above, when the interrupt request signal is applied to the interrupt control circuit of the present invention, the processing mode discrimination starts from the timing "100B" of the scanning register 160 and finishes for one clock so that the macroservice is quickly received.

Since the timing signals are controlled and the processing mode discrimination starts by the interrupt request detection signal 201, the processing mode discrimination starts by a next clock when either of the interrupt request signals 3 or 4 is applied. In this embodiment, the waiting time is not necessary and the macroservice is received for 2 clocks.

In the prior art interrupt control unit, in the case that the interrupt processing mode is set to the macroservice, the mean value of the waiting time for the start of the scanning and the time for the priority discrimination has been 6 clocks. On the other hand, in the interrupt control unit in accordance with the present invention, the clocks required till the start of the interrupt processing set to the macroservice is 4 clocks at maximum, which corresponds to the waiting time for the start of the scanning. In this way, the interrupt processing mode discrimination is executed prior to the priority discrimination. Thus, the acknowledgement responding to the interrupt by macroservice becomes faster and there is no overhead of the macroservice.

Further, the coincidence between the scanning register and the priority indication register is discriminated for each bit from the most significant bit, and the content of the scanning register is updated in accordance with the result of the discrimination. Thus, the time required for the priority discrimination is reduced and the acknowledgement in response to the vector interrupt becomes faster.

The embodiments mentioned above were described with two interrupt sources and four levels of priority. However, according to the present invention, it is possible to increase the numbers of the interrupt sources and the priority order levels easily without remarkably lowering the interrupt receiving response performance.

Thus, the construction of the present invention provides an interrupt control unit in which the interrupt processing mode and the priority discrimination can easily start immediately after the input of an interrupt request and which have a good performance in responding to the interrupt processing request by macroservice.

The invention has thus been shown and described with reference to the specific embodiments. However, it should be noted that the present invention is in no way limited to the details of the illustrated structures but changes and modifications may be made within the scope of the appended claims.

We claim:

1. An interrupt control unit for use with interrupt sources, comprising:
   a plurality of interrupt memory circuits each for storing data representing a state of an interrupt processing request for each interrupt source,
   interrupt request circuits each being provided for and operatively coupled to each interrupt request memory circuit,
   interrupt processing mode indication circuits each being provided for and operatively coupled to each interrupt request circuit for storing interrupt processing mode information,
   priority level indication circuits each being provided for and operatively coupled to each interrupt request circuit, for storing acknowledgement order information representing priority level data,
   a plurality of search information generating circuits, operatively coupled to said interrupt request circuits, each for generating search information, said search information including interrupt processing mode search information and priority order search information for each of said interrupt request circuits,
   a search information comparison circuit, operatively coupled to the interrupt processing mode indication circuits, the priority level indication circuits and the search information generating circuits, for detecting a state of the interrupt request circuit provided for each interrupt request memory circuit, and for comparing the interrupt processing mode information stored in the interrupt processing mode indication circuits and the acknowledgement order information stored in the priority level indication circuits with the search information generated by the search information generating circuits, by extending a comparison range step by step from a first range including only the interrupt processing mode information, the search information comparison circuit generating an internal interrupt request signal when a coincidence is obtained in the comparison range, and
   control means, operatively coupled to said search information comparison circuit and the search information generating circuit, for updating the interrupt processing mode search information and the priority order search information in the search information generating circuit in accordance with a result of the comparison by the search information comparison circuit, an output of the search information comparison circuit being monitored by said control means, and
   when data of the interrupt processing mode search information of the search information generating circuit coincides with data of one of the interrupt processing mode indication circuits, an internal interrupt receipt signal is generated by said control means in response to the interrupt request signal generated by the search information comparison circuit, and
   when data of the interrupt processing mode search information of the search information generating circuit does not coincide with data of any one of the interrupt processing mode indication circuits, the interrupt processing mode search information is updated and an internal interrupt receipt signal is generated by said control means in response to the internal interrupt request signal generated by the search information comparison circuit when data of the priority order search information of the search information generating circuit perfectly coincides with data of the acknowledgement order information of one of the priority order indication circuits,
   wherein said search information generating circuit includes means for discriminating said interrupt processing mode search information prior to the priority order search information.

2. An interrupt control unit as claimed in claim 1 wherein the search information comparison circuit includes means for comparing data of the interrupt processing mode indication information with data of the priority order indication information by comparing the interrupt processing mode indication information bits, and thereafter comparing the most significant bit of the acknowledgement order information of the plurality of priority level indication circuits and then continuously conducting a comparison while increasing the range of the comparison bit by bit.

3. An interrupt control unit as claimed in claim 2 further including means for stopping operation of the search information generating circuits when the interrupt processing mode of the search information generating circuits coincides with one of the interrupt processing mode indication circuits.

4. An interrupt control unit as claimed in claim 1 further including means for stopping operation of the search information generating circuits when the interrupt processing mode of the search information generating circuits coincides with one of the interrupt processing mode indication circuits.

5. An interrupt control unit comprising:
   at least two interrupt control registers each for storing interrupt processing mode information and interrupt priority level information and including means for comparing search information,
   a scan control circuit, operatively coupled to said interrupt control registers, for generating search information corresponding to the interrupt processing mode information and the interrupt priority level information stored in said interrupt control registers, and
   a timing generation circuit, operatively coupled to said interrupt control registers and said scan control circuit, for controlling the search information comparing means of said interrupt control registers for making a comparison of the search information of the scan control circuit with the interrupt processing mode information stored in said interrupt control registers, so that if said search information generated by said scan control circuit coincides with said interrupt processing mode information stored in said interrupt control registers, an interrupt request is acknowledged, and if the search information generated by said scan control circuit does not coincide with said interrupt processing mode information stored in said interrupt control registers, updating of the search information and the comparison of the search information with the interrupt processing mode information are repeated so as to finally select the interrupt request to be acknowledged,
   wherein said scan control unit includes means for discriminating said interrupt processing mode information prior to the interrupt priority order level information.

* * * * *